(12) United States Patent
Dong

(10) Patent No.: US 8,199,467 B2
(45) Date of Patent: Jun. 12, 2012

(54) BATTERY EJECTOR AND ELECTRONIC DEVICE USING THE SAME

(75) Inventor: Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 215 days.

(21) Appl. No.: 12/771,218

(22) Filed: Apr. 30, 2010

(65) Prior Publication Data

US 2011/0026200 A1 Feb. 3, 2011

(30) Foreign Application Priority Data

Jul. 31, 2009 (CN) .......................... 2009 1 0305069

(51) Int. Cl.
*H05K 7/00* (2006.01)
*H01M 2/10* (2006.01)

(52) U.S. Cl. .................. 361/679.01; 429/97; 429/100; 455/90.3; 455/575.8; 361/679.56

(58) Field of Classification Search ............. 361/679.01, 361/679.56; 429/96, 97, 100; 455/90.3, 455/550.1, 575.8
See application file for complete search history.

(56) References Cited

U.S. PATENT DOCUMENTS

| | | | | |
|---|---|---|---|---|
| 3,445,297 A * | 5/1969 | Sidell | ............................... | 429/98 |
| 4,031,295 A * | 6/1977 | Rigazio | ............................ | 429/100 |
| 5,882,816 A * | 3/1999 | Gotou | ............................ | 429/100 |
| 6,796,819 B2 * | 9/2004 | Chen et al. | ..................... | 439/160 |
| 7,917,185 B2 * | 3/2011 | Shi et al. | ..................... | 455/575.8 |
| 8,094,439 B2 * | 1/2012 | Lin | ........................... | 361/679.01 |
| 2004/0202922 A1 * | 10/2004 | Tsai et al. | ....................... | 429/96 |
| 2007/0077487 A1 * | 4/2007 | Yang et al. | .................... | 429/187 |
| 2010/0021803 A1 * | 1/2010 | Wang | ............................ | 429/100 |
| 2010/0081044 A1 * | 4/2010 | Rejman et al. | .................. | 429/96 |
| 2010/0099017 A1 * | 4/2010 | Huang et al. | .................. | 429/100 |
| 2010/0124699 A1 * | 5/2010 | Ng et al. | ....................... | 429/100 |
| 2010/0209754 A1 * | 8/2010 | Zuo | .............................. | 429/100 |
| 2010/0221593 A1 * | 9/2010 | Huang | .......................... | 429/100 |
| 2011/0033740 A1 * | 2/2011 | Zhang | .......................... | 429/100 |
| 2011/0036740 A1 * | 2/2011 | Zhang | .......................... | 206/477 |

* cited by examiner

*Primary Examiner* — Robert J Hoffberg

(74) *Attorney, Agent, or Firm* — Altis Law Group, Inc.

(57) ABSTRACT

An electronic device includes a housing, an ejecting piece, a shaft and a circuit board. The housing has a front surface, an opposite rear surface, and a battery chamber defined in the front surface for receiving a battery therein. The ejecting piece is rotatably hinged to the housing and configured to support a portion of the battery and eject the battery from the battery chamber. The ejecting piece has an ejecting portion and an operating portion connecting with the ejecting portion, the ejecting portion is for assembly under the battery. The shaft is configured for hinging the ejecting piece to the housing. The circuit board is mounted on the rear surface of the housing for electrically connecting with the battery.

9 Claims, 5 Drawing Sheets

BATTERY EJECTOR AND ELECTRONIC DEVICE USING THE SAME

BACKGROUND

1. Technical Field

The exemplary disclosure generally relates to ejectors, and particularly, to a battery ejector and electronic device using the battery ejector.

2. Description of Related Art

Batteries are widely used in electronic devices, such as personal digital assistants (PDAs), mobile phones, etc. Conventional batteries are detachably received in the electronic device to ensure the batteries and inner circuits of the electronic devices are protected.

The electronic device typically includes a battery, a housing defining a battery chamber for assembling the battery therein, and a cover detachably assembled to the housing to envelop the battery within the battery accommodating space. However, the user usually needs to apply a large force to disassemble the tightly secured battery from the battery chamber of the housing.

Therefore, there is room for improvement within the art.

BRIEF DESCRIPTION OF THE DRAWINGS

Many aspects of the battery ejector and electronic device using the same can be better understood with reference to the following drawings. These drawings are not necessarily drawn to scale, the emphasis instead being placed upon clearly illustrating the principles of the present battery ejector and electronic device using the same. Moreover, in the drawings like reference numerals designate corresponding sections throughout the several views.

DETAILED DESCRIPTION

Figure 1:
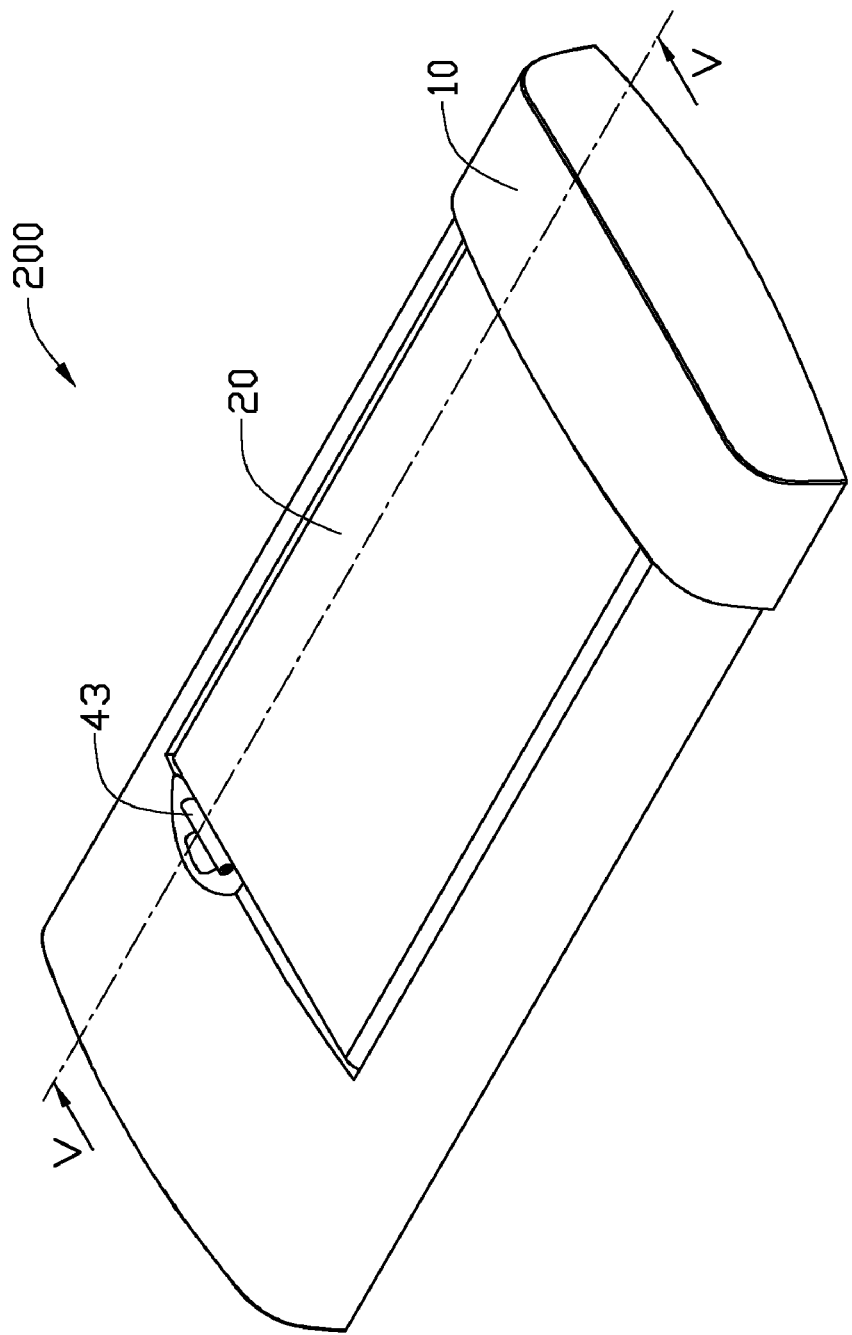
FIG. 1 shows an assembled, perspective view of an electronic device with a battery ejector applied thereto, in accordance with an exemplary embodiment.
Figure 2:
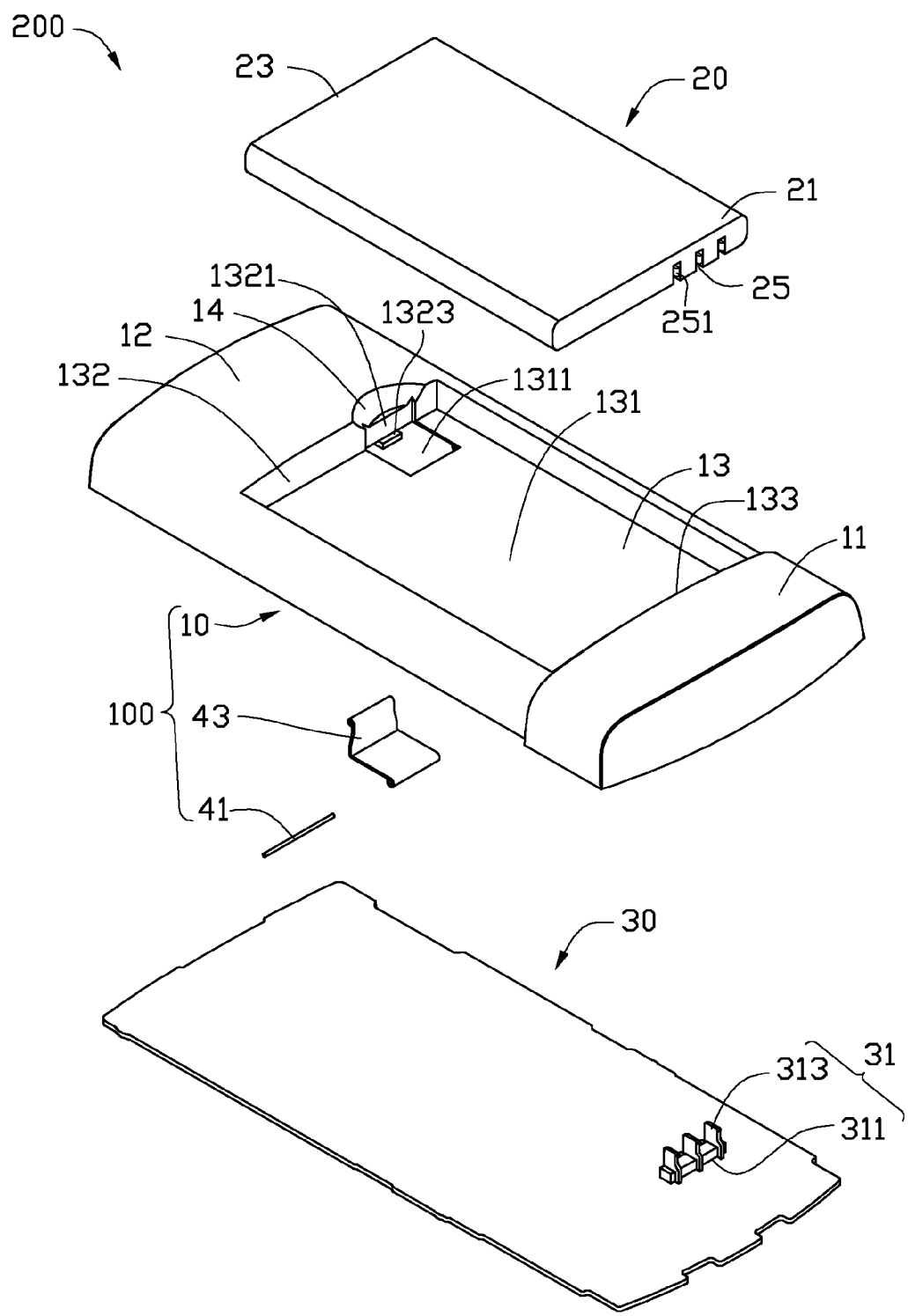
FIG. 2 shows an exploded, perspective view of the electronic device of FIG. 1.
Figure 3:
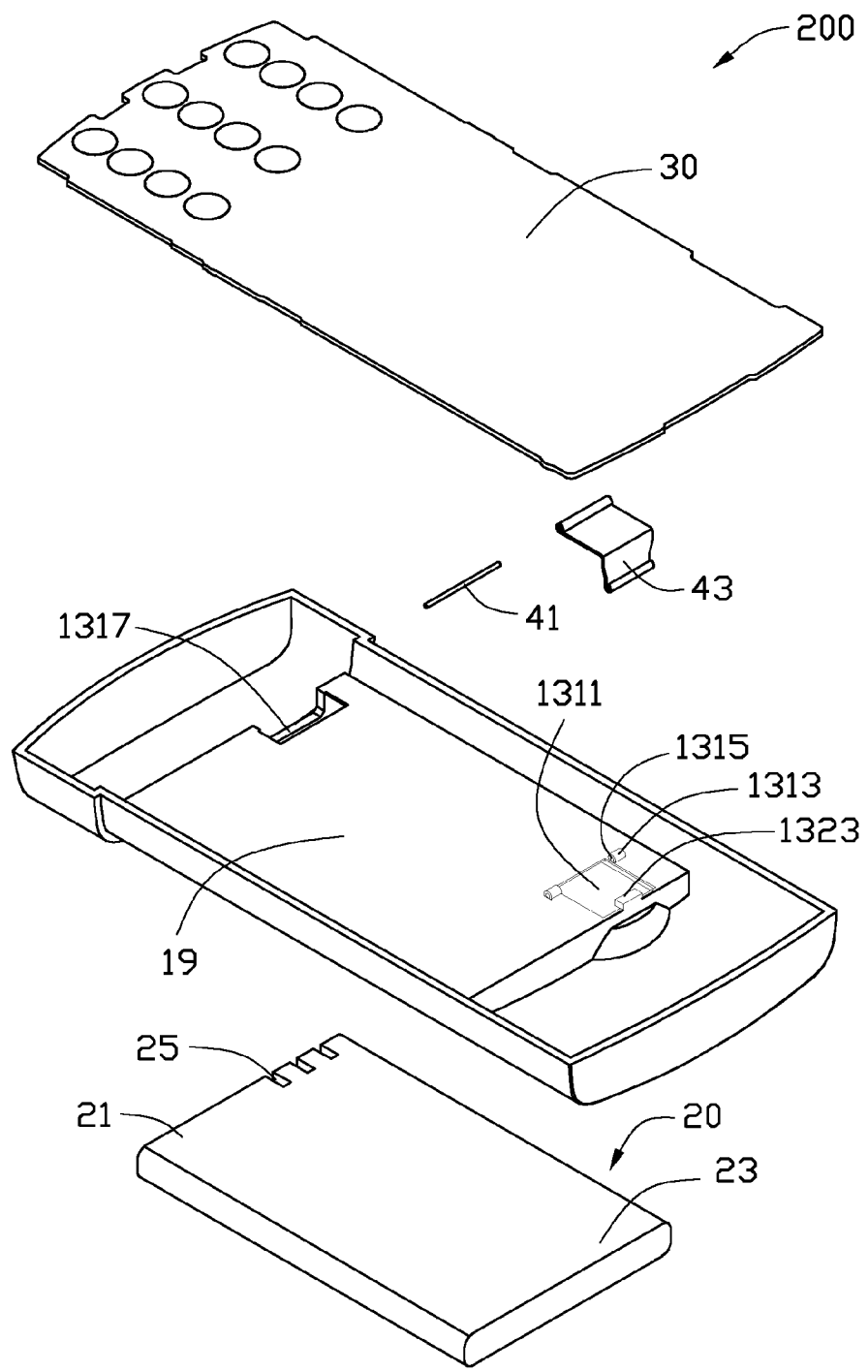
FIG. 3 is similar to FIG. 2, but viewed from another aspect.

FIGS. 1-3 show an exemplary electronic device 200 (such as a mobile phone, a personal digital assistant (PDA), a digital camera, etc.). The electronic device 200 includes a housing 10, a battery ejector 100, a battery 20, and a circuit board 30. The battery ejector 100 includes a shaft 41, and an ejecting piece 43. The housing 10 may be a main body or a shell of the electronic device 200. The housing 10 includes a front surface 11 and a rear surface 19 opposite to the front surface 11. One end of the front surface 11 is recessed to form an assembling surface 12 for assembling a battery cover (not shown). A battery chamber 13 is defined in the assembling surface 12 of the front surface 11 of the housing 10 for receiving the battery 20 therein.

The battery chamber 13 includes a base wall 131, a first end wall 132, and a second end wall 133 opposite to the first end wall 132. The base wall 131 includes an assembling hole 1311 defined therethrough adjacent to the first end wall 132 and a stepped through connecting hole 1317 defined adjacent to the second end wall 133, opposite to the assembling hole 1311. Two hinged portions 1313 protrude outwardly from the rear surface 19 and are located on opposite sides of the assembling hole 1311, opposite to the first end wall 132. Each hinged portion 1313 defines a shaft hole 1315 therethrough, having an axis parallel to the first end wall 132. A resisting block 1323 protrudes outward from the first end wall 132, adjacent to the side of the rear surface 19, and accommodated within the assembling hole 1311. An accommodating slot 1321 is recessed in the first end wall 132. The two ends of the accommodating slot 1321 communicate with the assembling hole 1311. A depression 14 is recessed in the assembling surface 12 adjacent to the first end wall 132 and communicates with the accommodating slot 1321 and the battery chamber 13.

The shaft 41 is cylindrical and configured for hinging the ejecting piece 43 to the housing 10.

Figure 4:
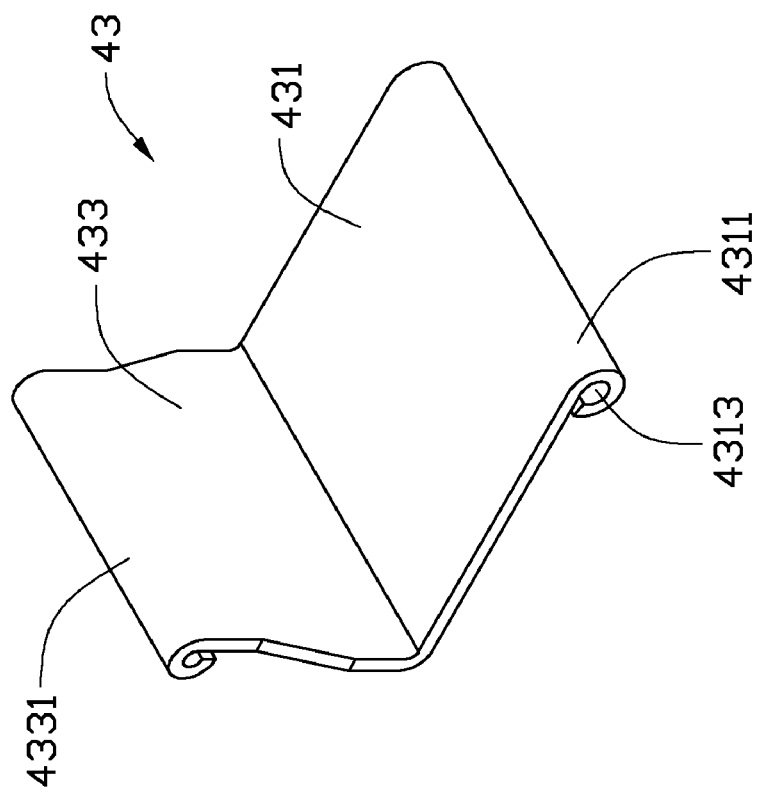
FIG. 4 shows an enlarged perspective view of an ejecting piece of the electronic device shown in FIG. 2.

Referring to FIG. 4, the ejecting piece 43 is a substantially L-shaped metal sheet configured for being hinged to the housing 10 by the shaft 41 for ejecting a battery 20 assembled within the battery chamber 13. The ejecting piece 43 includes an ejecting portion 431 and an operating portion 433 extending perpendicular to and from one distal end of the ejecting portion 431. The ejecting portion 431 is a rectangular board having a shape and size corresponding to the assembling hole 1311 of the housing 10. The ejecting portion 431 is configured for being assembled and accommodated within the assembling hole 1311 for supporting a portion of and ejecting the battery 20. The end of the ejecting portion 431 distal to the operating portion 433 forms an at least partially cylindrical shaped hinged end 4311. The hinged end 4311 includes a shaft hole 4313 configured for assembling the shaft 41. The operating portion 433 is a rectangular board with the shape and size corresponding to the accommodating slot 1321, and for assembly within the accommodating slot 1321. The distal end of the operation portion 433 forms an operating end 4331 corresponding to the depression 14 of the housing 10.

The battery 20 is assembled within the battery chamber 13 of the housing 10. The battery 20 includes a connecting end 21 and an ejecting end 23 opposite to the connecting end 21. A plurality of spaced grooves 25 is defined in the connecting end 21 of the battery 20 corresponding to the connecting hole 1317 of the housing 10. Each groove 25 has an electrical terminal 251 assembled therein for electrically connecting with the circuit board 30.

The circuit board 30 can be mounted on the rear surface 19 of the housing 10. The circuit board 30 includes a connecting block 31 disposed thereon and is configured for extending through the connecting hole 1317 to electrically connect with the battery 20. The connecting block 31 includes a rectangular base block 311 and a plurality of spaced contacting terminals 313 configured for electrically connecting with the corresponding electrical terminals 251 of the battery 20.

Figure 5:
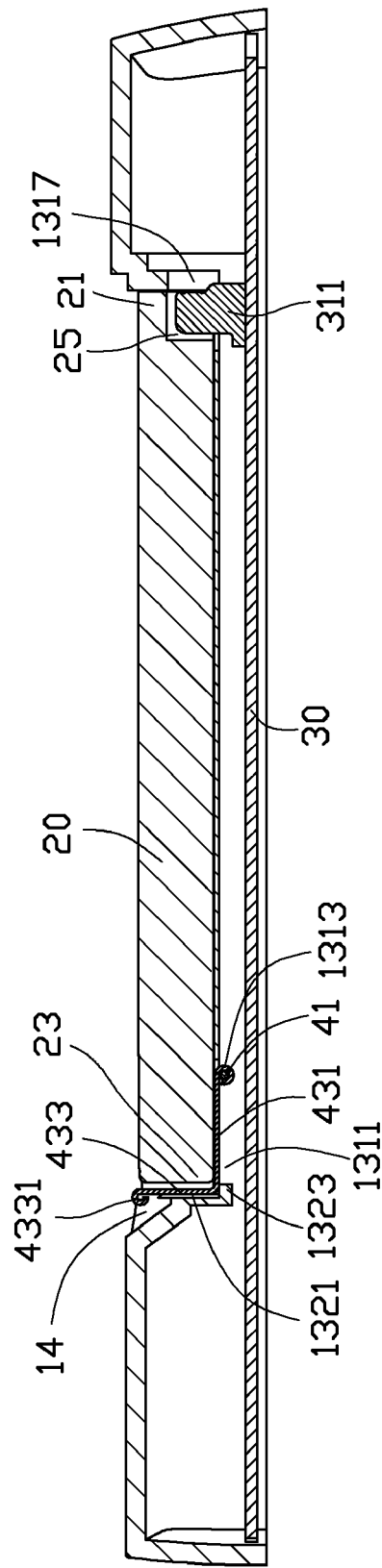
FIG. 5 shows a cross-section of the electronic device of FIG. 1 taken along line V-V.

Referring to FIG. 5, to assemble the battery ejector 100, the shaft 41 is inserted through the shaft hole 4313 of the hinged end 4311 of the ejecting piece 43. The two ends of the shaft 41 extend into the two shaft holes of the two hinged portions 1313 respectively to hinge the ejecting piece 40 to the housing 10. The ejecting portion 431 is assembled and accommodated within the assembling hole 1311. The integral unit of the ejection portion 431 and the operating portion 433 resists on the resisting block 1323. The operating portion is assembled and accommodated within the corresponding accommodating slot 1321 of the housing 10. The operating end 4331 is accommodated within the depression 14 of the housing. The circuit board 30 is mounted on the rear surface 19 of the housing 10, with the connecting block 31 extending through the corresponding assembling hole 1311 of the housing 10. The battery 20 is assembled within the battery chamber 13 of the housing 10, and the connecting end 21 resists against the second end wall 133. The contacting terminals 313 of the connecting block 31 latch in the grooves 25 of the battery 20 to electrically connect with the corresponding connecting terminals 251. The opposite ejecting end 23 of the battery 20 resists the corresponding first end wall 132 and supports a portion of the corresponding ejecting portion 431 of the ejecting piece 43.

To detach the battery 20 from the battery chamber 13 of the housing 10, a small external force is applied to the operating end 4331 toward the second end wall 133, rotating the ejecting piece 43. The ejecting portion 431 of the ejecting piece 43 is rotated to eject the ejecting end 23 of the battery 20, which is supported by the ejecting portion 431. Then, the ejecting end 23 of the battery 20 emerges out from the assembling surface 12 of the housing 10 allowing for easy removal. When the battery 20 is taken out, the ejecting piece 43 is rotated back to its original position.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery ejector assembled within a battery chamber of a housing and configured to eject a battery from the battery chamber, the battery ejector comprising:
    an ejecting piece rotatably hinged to the housing, the ejecting piece having an ejecting portion and an operating portion connecting with the ejecting portion, the ejecting portion configured for supporting a portion of and ejecting the battery; and
    a shaft configured for hinging the ejecting portion of the ejecting piece to the housing,
    wherein the battery chamber includes a base wall and a first end wall, the base wall includes an assembling hole defined therethrough adjacent to the first end wall; the ejecting portion of the electing piece is hinged to the base wall and accommodated within the assembling hole, and one end of the battery supported by the ejecting portion, and
    wherein the housing further includes a resisting block protruding from the first end wall adjacent to a rear surface of the housing and accommodated within the assembling hole for holding the ejecting piece.

2. The battery ejector as claimed in claim 1, wherein the first end wall includes an accommodating slot recessed therein communicating with the assembling hole; and the operating portion has an operating end disposed at the distal end thereof and is assembled within the accommodating slot with the operating end emerging out from the battery chamber.

3. The battery ejector as claimed in claim 2, wherein the housing includes the rear surface and an opposite front surface, one end of the front surface is recessed in to form an assembling surface configured for assembling with a battery cover; the battery chamber is defined in the assembling surface.

4. The battery ejector as claimed in claim 3, wherein the housing further includes two hinged portions disposed adjacent to the assembling hole opposite to the first end wall, each hinged portion defines a hinge shaft hole therethrough; the ejecting portion includes a hinged end having an electing shaft hole defined therethrough; and the shaft penetrates through the electing shaft hole of the hinged end and two ends of the shaft are hinged to the corresponding two hinged portions of the housing.

5. A battery ejector comprising:
    a housing having a battery chamber configured for assembling a battery therein;
    an ejecting piece rotatably hinged to the housing and configured for supporting a portion of the battery and ejecting the battery from the battery chamber, the ejecting piece having an ejecting portion and an operating portion connecting with the ejecting portion, the ejecting portion for assembly under the battery; and
    a shaft configured for hinging the ejecting piece to the housing,
    wherein the battery chamber includes a base wall and a first end wall, the base wall includes an assembling hole defined therethrough adjacent to the first end wall; the electing portion of the electing piece is hinged to the base wall and accommodated within the assembling hole, and one end of the battery supported by the electing portion and resisting against the first end wall, and
    wherein the first end wall includes an accommodating slot recessed therein communicating with the assembling hole and a resisting block protruding therefrom located within the assembling hole for holding the electing piece, and the operating portion has an operating end disposed at the distal end thereof and is assembled within the accommodating slot with the operating end emerging out from the battery chamber.

6. The battery ejector as claimed in claim 5, wherein the housing includes a front surface, an opposite rear surface and two hinged portions, the battery chamber is recessed in the front surface; the two hinged portions disposed adjacent to the assembling hole and located at the two sides of the assembling hole opposite to the first side wall, each hinged portion of the two hinged portions defines a shaft hole therethrough, the ejecting portion has a hinged end; and the shaft passing through the hinged end of the ejecting portion and the two ends of the shaft are hinged to the corresponding two hinged portions of the housing respectively.

7. An electronic device, comprising:
    a housing having a front surface, an opposite rear surface, and a battery chamber defined in the front surface for receiving a battery therein;
    an ejecting piece rotatably hinged to the housing and configured to support a portion of the battery and eject the battery from the battery chamber, the ejecting piece having an ejecting portion and an operating portion connecting with the ejecting portion, the ejecting portion for assembly under the battery;
    a shaft configured for hinging the ejecting piece to the housing; and
    a circuit board mounted on the rear surface of the housing for electrically connecting with the battery,
    wherein the battery chamber includes a base wall, a first end wall and a second end wall opposite to the first end wall, the base wall includes an assembling hole defined therethrough adjacent to the first end wall; the electing portion of the electing piece is hinged to the base wall and accommodated within the assembling hole, and one end of the battery supported by the electing portion and resisting against the first end wall, and
    wherein the first end wall includes an accommodating slot recessed therein communicating with the assembling hole and a resisting block protruding therefrom located within the assembling hole for holding the electing piece, and the operating portion has an operating end disposed at the distal end thereof and is assembled within the accommodating slot with the operating end emerging out from the battery chamber.

8. The electronic device as claimed in claim 7, wherein the housing further includes two hinged portions disposed adjacent to the assembling hole and located at the two side of the assembling hole opposite to the first side wall, each hinged portion of the two hinged portions defines a shaft hole therethrough, the ejecting portion has a hinged end; and the shaft passing through the hinged end of the ejecting portion and two ends of the shaft are hinged to the corresponding two hinged portions of the housing respectively.

9. The electronic device as claimed in claim 7, wherein the circuit board includes a connector portion disposed thereon; the battery includes a connecting end and an opposite ejecting end, the connecting end includes an electric connecting portion disposed thereon for establishing electric connect with the connector portion of the circuit board; the base wall further includes a connecting hole defined therethrough adjacent to the second end wall; and the connector portion penetrates through the connecting hole to electrically connect with the electric connecting portion of the battery.

* * * * *